June 29, 1937. F. H. KAUP ET AL 2,085,160
FREEZING DEVICE FOR EDIBLES
Filed Feb. 7, 1935  3 Sheets-Sheet 1
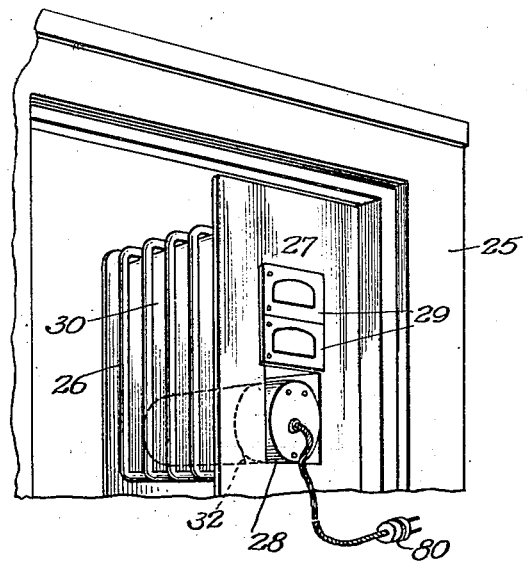
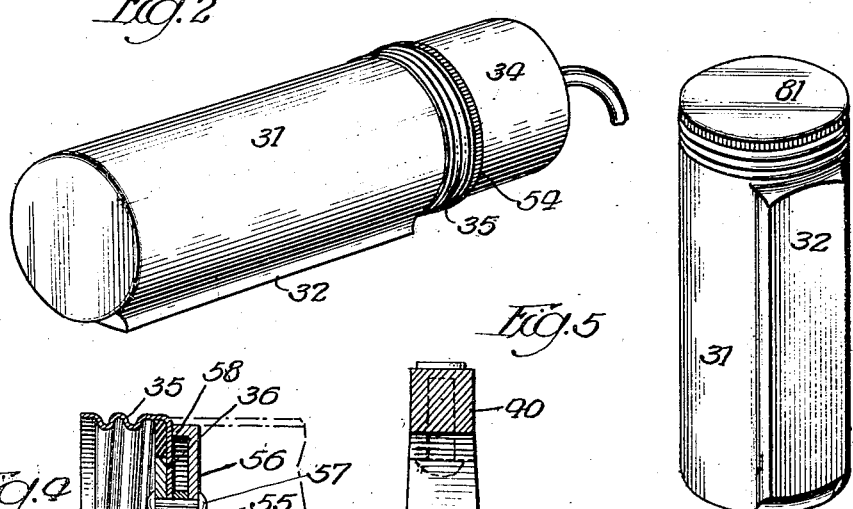
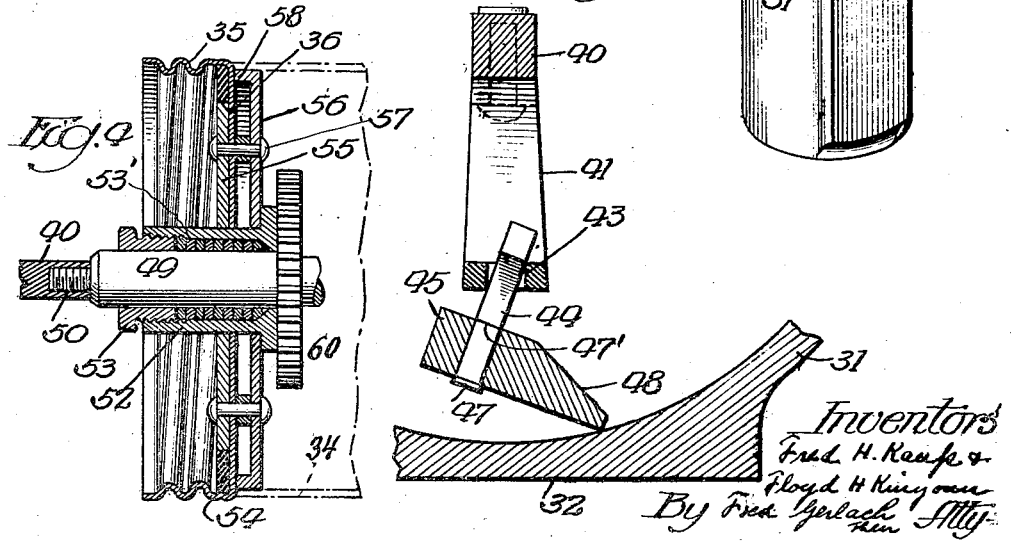

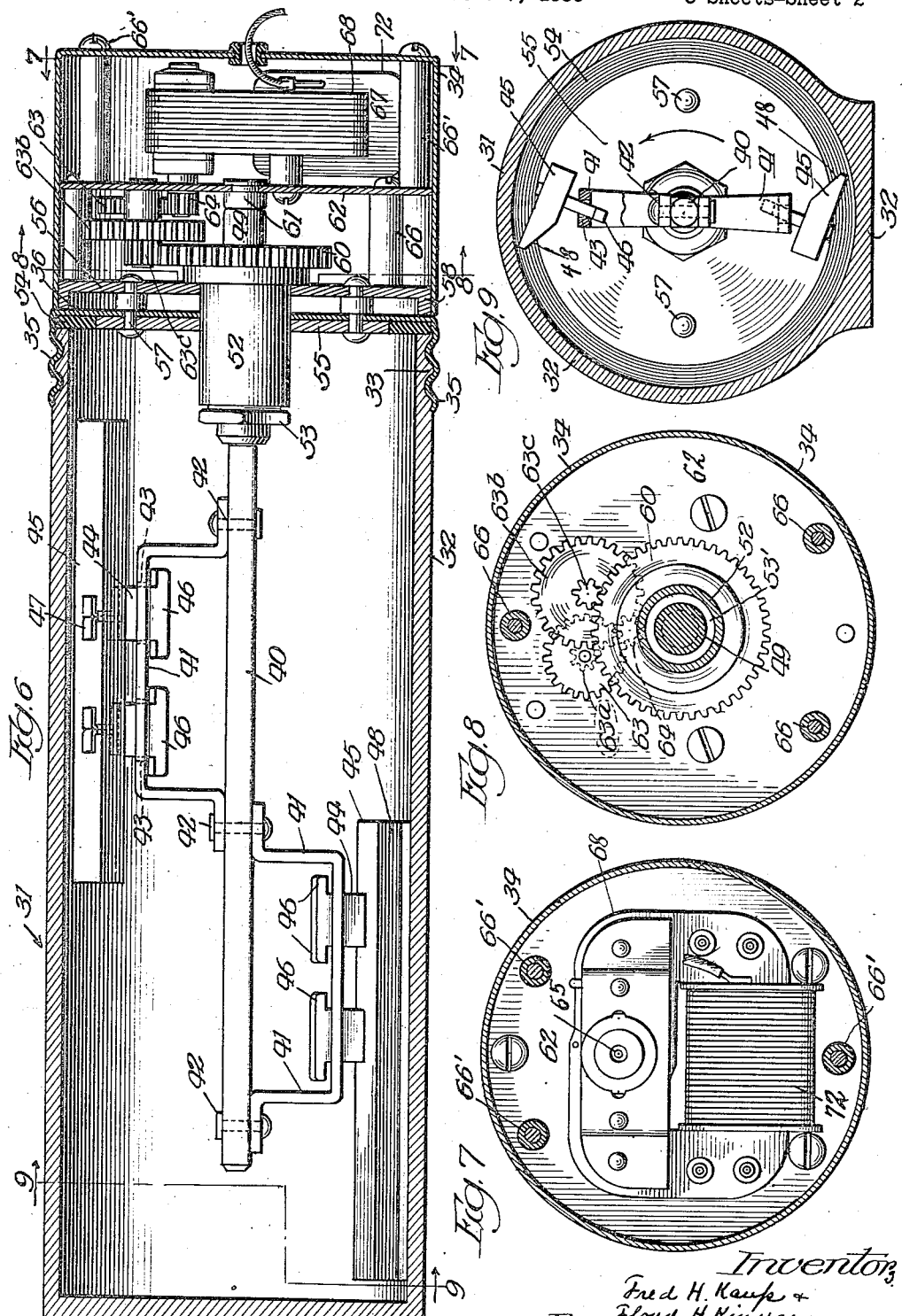

June 29, 1937.    F. H. KAUP ET AL    2,085,160
FREEZING DEVICE FOR EDIBLES
Filed Feb. 7, 1935    3 Sheets-Sheet 3
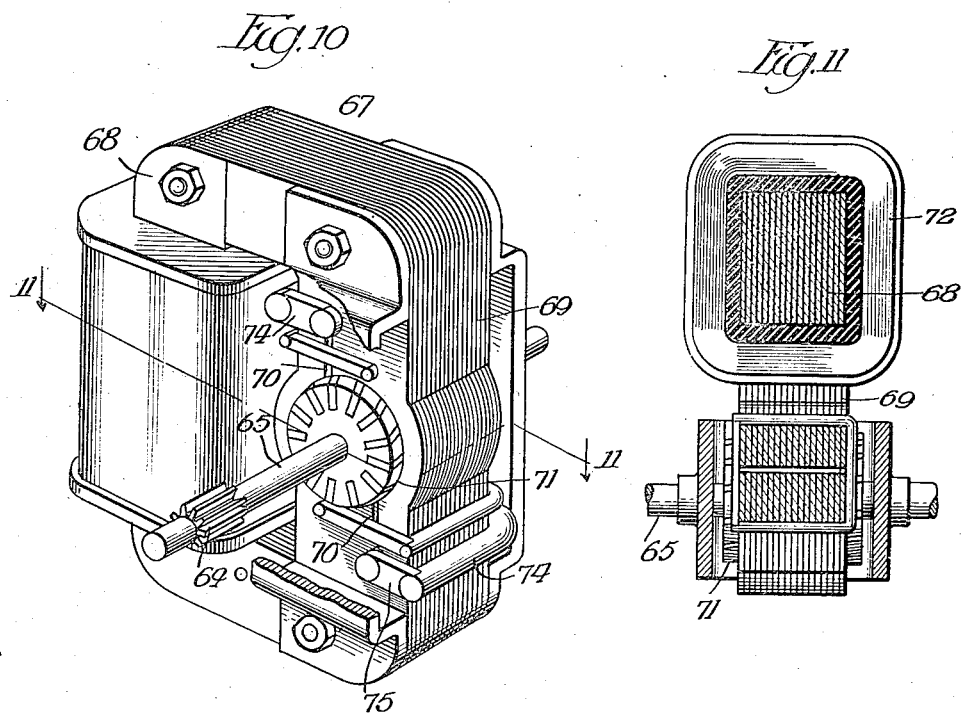
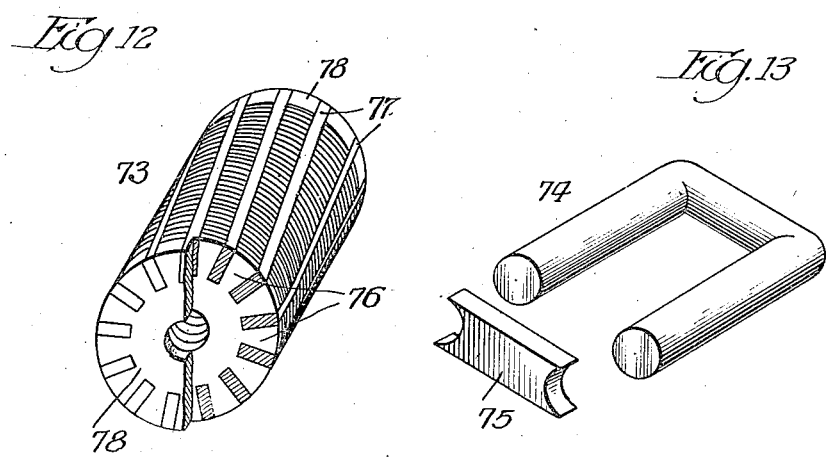
Inventors.
Fred H. Kaup &
Floyd H. Kinyoun
By Fred Gerlach
their Atty.

Patented June 29, 1937

2,085,160

UNITED STATES PATENT OFFICE 2,085,160

FREEZING DEVICE FOR EDIBLES

Fred H. Kaup and Floyd H. Kinyoun,
Omaha, Nebr.

Application February 7, 1935, Serial No. 5,380

5 Claims. (Cl. 259—109)

The invention relates generally to freezers for making frozen edibles, such as ice cream, ices and the like. More particularly the invention relates to that type of freezer which is adapted to be inserted into and removed from the usual refrigerating coil or element of a mechanical refrigerator and comprises a substantially cylindrical open ended container for the edible forming material, a rotary agitator in the container and an electric motor and speed-reducing gearing for driving the agitator.

The primary object of the invention is to provide an improved freezer of this type in which the cylindrical container is formed of metal of high conductivity and has on its exterior a flat longitudinally and transversely extending surface which is designed to rest on and contact with the refrigerating element and is formed on a solid integral portion of the container-wall for efficient conduction of heat from the inner periphery of the container to the refrigerating element; in which the agitator, motor and speed reducing gearing are supported and carried by a mounting which has affixed thereto a detachable closure for the open end of the container so that all of the operating parts may be connected to and removed from the container as a unit in which the closure on the mounting for the agitator and motor is provided with a screw-thread whereby it may be readily connected to the container after the latter has been charged with the material, and readily detached from the container when the frozen material is to be removed therefrom; in which spring-clutches or couplings for switching off the motor after freezing of the material are dispensed with by utilizing a suitable induction motor of limited power and a continuous connection between the agitator and the motor whereby the resistance of the frozen material will cause the motor to stop without resulting in sparking in the motor or the generation of heat; in which the agitator is so designed that it is possible to use a small low power electric motor; in which the agitator comprises scraper bars which are formed so that the material will not freeze thereon, and so that they will continue to operate after the material commences to freeze in the container; and in which the motor and reduction gearing drive the agitator at a speed for efficient thermal conduction from the material to the refrigerating element in order to freeze the material in a comparatively short period and to avoid excessive agitation which tends to retard freezing.

Other objects of the invention and the various advantages and characteristics of the present freezer will be apparent from a consideration of the following detailed description.

The invention consists in the several novel features which are hereinafter set forth and are more particularly defined by claims at the conclusion hereof.

In the drawings which accompany and form a part of the present specification or description and in which like numerals of reference denote corresponding parts:

Fig. 1 is a fragmentary perspective view showing a freezer embodying the invention mounted in the freezing compartment of a refrigerator. Fig. 2 is a perspective of the freezer. Fig. 3 is a perspective of the container with the operating mechanism removed and with a screw-cap for sealing the container with the frozen material therein. Fig. 4 is a longitudinal section through the bearing for the agitator shaft. Fig. 5 is a detail section through one of the scraper or paddle bars and the agitator shaft. Fig. 6 is a longitudinal section of the freezer. Fig. 7 is a transverse section on the line 7—7 of Fig. 6. Fig. 8 is a section on the line 8—8 of Fig. 6. Fig. 9 is a section on the line 9—9 of Fig. 6. Fig. 10 is a perspective of the induction motor for driving the agitator shaft. Fig. 11 is a section on the line 11—11 of Fig. 10. Fig. 12 is a perspective of the armature of the motor. Fig. 13 is a perspective of the shading rings for the motor.

The freezer which forms the subject matter of the invention is adapted for use in making ice cream, ices and like frozen edibles and is designed to be used in connection with an electric refrigerator. The refrigerator which is shown in Fig. 1 of the drawings is of conventional design and has a freezing compartment in which is mounted, in usual manner, a heat absorbing or refrigerating coil 26. The latter is located behind a panel 27 and extends around a pair of superimposed ice forming trays 29 and also around a subjacent compartment 28. The coil 26 is usually provided with a metal lining 30 in which the compartment 28 is formed and trays 29 are supported.

The freezer is adapted to be placed in a horizontal position in the compartment 28 as shown in Fig. 1 and comprises a cylindrical container 31 which is formed of cast aluminum or aluminum alloy having a high degree of thermal conductivity. One end of the container 31 is closed by an integral wall and its other end is open so that when the container is set on its closed end it may be conveniently filled with the material or mixture to be frozen. The container has a truly cylindrical inner periphery and embodies on the exterior thereof and along its bottom portion an integral enlargement. This enlargement, as shown in Fig. 3, extends substantially from one end of the container to the other and has a flat bottom surface 32. The latter is adapted to contact with and rest on the lining 30. It serves to prevent rolling of the container and is of such area that efficient thermal conduction is obtained between the inner periphery of the container and the refrigerating coil 26 when the freezer is in its operative position in the compartment 28. The enlargement which has or embodies the flat surface 32 is solid throughout, and has substantially no thickness whatsoever at the central portion thereof. Because of the latter the flat surface 32 is spaced from the inner periphery of the container a distance substantially equal to the thickness of the container, and hence serves to minimize loss in conduction from the container to the refrigerating coil. Adjacent its open end, the container 31 is provided with an external screw-thread 33.

In addition to the container 31, the freezer comprises a detachable mounting at the open end of the container. This mounting carries a paddle-equipped agitator shaft 40, an electric motor, and reduction gearing between the motor and the agitator shaft, and is provided with a cap 36 for sealing the open end of the container. The cap, motor, gearing and agitator together with the mounting constitute a unit which may readily be removed or detached from the container when it is desired to charge the latter. The cap 36 is formed of sheet metal and is provided with an internally screw-threaded flange 35 to fit the external screw-thread 33 on the outer periphery of the container. The mounting comprises a plate 56 which is provided with a circumferential flange 58 fitting against the outer face of the cap 36; a plate 55 which fits against the inner face of said cap and is secured to the cap by rivets 57; a partition-plate 62 which is spaced from the plate 56 is secured to the latter by screws and spacers 66; and a cup-shaped housing 34 which has a cylindrical flange extending to the cap 36, and is removably secured to the partition-plate 62 by screws and spacers 66'. A sealing gasket 54 of suitable material, such as composition or rubber, is confined in the cap 36 between the plate 55 and the flange 35 so it will be clamped between the cap and the rim of the container 31 when the mounting and cap are screwed tightly onto the container.

The agitating shaft 40 is adapted to be inserted into and removed from the container and is secured by a screw 50 to a spindle 49. The latter is journaled in a stuffing box 52 which is fixedly secured in the plates 55, 56 and comprises a gland nut 53 and packing 53'. Shaft 40 is preferably square in cross section. A pair of longitudinally extending loops 41 of metal are secured respectively, as at 42, to the opposite sides of shaft 40, and are longitudinally offset. A longitudinally extending paddle bar 45 is pivotally mounted in each of the loops 41 and consists of a strip of wood to which the material will not adhere even while it is partially frozen. Each bar 45 is connected to its loop 41 by a pair of metallic stems 44 which extend through slots 43 in the loop and through the bar 45. The inner ends of the stems 44 are provided with longitudinally projecting shoulders or ears 46 to retain the bars in connected relation with the loops 41 and shaft 40. The outer ends of the stems are upset, as at 47, and fixedly secure the bars against shoulders on the stems 44. As shown in Fig. 5, the slots 43 are shaped to permit the stems 44 and bars 45 to rock transversely of the axis of the shaft. The leading portion of each bar 45 extends beyond the stems a greater distance than the trailing portion and is bevelled, as at 48, at its front edge, for scraping contact with the inner periphery of the container. The bevelled portions of the paddle bars deflect the partially frozen material inwardly and in response to the pressure of the material thereagainst cause the bars to keep their forward edges in contact with the inner periphery of the container. The agitator or paddle bars, in their rotation, scrape the material as it congeals on the lower portion of the container above the flat surface 31 from the inner periphery of the container and thereby prevent the rapid building up of frozen material in that portion of the container and also cause the material to be thoroughly mixed and blended during the freezing operation. The paddle-bars 45 are oppositely arranged on the shaft 40 so they will alternately traverse the lower portion of the container. They are offset longitudinally as previously specified and each extends over approximately one-half of the length of the bottom of the container with sufficient overlap to insure agitation of material throughout the length of the bottom of the container. In a freezer of the type under consideration it is desirable to use as small a motor as possible and by providing paddle-bars which traverse approximately, or a little in excess of, one-half of the bottom of the container and act alternately on the material on the bottom of the container, a motor of minimum power will supply sufficient power for the agitation of the material and scraping the frozen material from the lower portion of the container during the freezing operation. The shaft 40 is supported entirely in the mounting for the electric motor and its inner end terminates outwardly of the inner end of the container. This leaves the inner end of the shaft measurably free or floating with the result that the shaft together with the paddle bars can be readily assembled or inserted in the container without requiring the insertion of the inner end of the shaft in a bearing at the inner end of the container.

The electric motor for driving the shaft 40 is of the induction type. It is removably mounted on the partition plate 62, embodies an armature shaft 65, and is disposed between said partition-plate and the outer end of the housing 34. The speed reducing gearing for driving the agitator-shaft 40 from the motor is mounted on the partition-plate 62 and is disposed between said partition-plate and the plate 56. The armature shaft 65 of the electric motor extends through the partition-plate 62 and is provided with a pinion 64 for driving the reduction gearing which comprises a gear 63. The latter meshes with and is driven by the pinion 64 and is mounted on a stud on the partition-plate 62; a pinion 63$^a$ which is fixed to gear 63; a gear 63$^b$ which is mounted on a stud on the plate 62 and meshes with the pinion 63$^a$; a pinion 63$^c$ which is fixed to the gear 63$^b$; and a gear 60 which is driven by the pinion 63$^c$ and is fixed to the spindle 49. The spindle 49 extends into a bearing 61 on the partition-plate 62.

The electric motor comprises a stator or field 67 which is composed of a plurality of laminations. The latter forms a substantially rectangular frame which as shown in Fig. 10 is open at its center and has opposed legs 68, 69. The leg 69 is diagonally split, as at 70, and the adjacent or overlapping portions thereof are provided with a cylindrical opening 71. The leg 68 of the stator is surrounded by a coil 72 for producing the field of the stator. In addition to the stator 67 the motor comprises an armature 73. The latter includes the shaft 65 and is located in the opening 71. The overlapping split ends of leg 69 provide two magnetic poles at diametrically opposed sides of the cylindrical opening 71. Shading rings 74, 75 are used in association with the opposite magnetic poles at opposite sides of the opening 71. The armature 73 is of the squirrel cage type and comprises an iron core or body. The latter is equal in length to the combined thickness of the laminations of the field leg 69 and is composed of laminations or disks which are mounted on the shaft 65 and have teeth 76. These teeth define notches between them which provide longitudinal grooves for inductor bars 77. The latter are electrically connected together by copper disks 78 at the ends of the rotor. The motor is proportioned in size to fit in the outer end of the housing 34 and is supplied with current by way of a cord 37 which extends through the end of the housing 34, has a plug 81 on one end thereof, and is branched for connection with the field coil 72.

The invention contemplates a permanent driving connection between the agitator shaft 40 and the motor and the stoppage of the motor by the resistance of the frozen material to the rotation of the paddle-bars 45 when the material has been sufficiently frozen, so that automatic switch throw-outs and uncoupling devices for that purpose, may be dispensed with and a simplification of the structure may be attained. For this purpose, the motor used is of the induction type in which there are no brushes which produce sparking, either when the motor is in operation or when it is blocked by the preponderating resistance of the material in the container to the rotation of the paddle-bars. The motor is constructed with a predetermined limited power so that it will automatically stop when the material has been frozen to the desired degree of density. By using an induction motor of low power it becomes possible to use a small motor, which is a desideratum in these devices, and no sparking will result from the stopping of the motor while the electric current continues to be applied to the motor. Insertion and removal of the plug with respect to a socket serves to control the supply of current to the motor and no switch for this purpose is necessary.

In practice it is desirable to stir or agitate the mixture to blend the constituents during the freezing operation and also to complete the freezing in as short a time as possible. In order to avoid excessive agitation, which will retard the freezing, particularly where the contact between the container and the refrigerating element is of limited area, as it must be in a device of this type, the motor is adapted through the reduction gearing to drive the paddle-bars at approximately 20 R. P. M. The container preferably has an internal diameter of $3\frac{1}{16}$ inches with the result that the surface speed of the paddle-bars is approximately 200 inches per minute. In practice it has been found that this speed of the paddle-bars will permit the freezing to proceed to completion in a comparatively short period and will produce a proper blending of the constituents of the mixture during the freezing operation to produce ice cream of a superior quality.

In the use of the freezer, the container 31 is first set on its closed end and the material or mixture to be frozen is poured into it. Thereafter the unit which comprises the cap 36, housing 34, agitator, motor and reduction gearing, is rotated relatively to the container until the screw cap 36 is seated tightly on and sealed against the open end of the container, the shaft 40 with the paddle-bars thereon being first directed into the container. The flange of the cap 36 is provided with a knurled portion so the unit can be conveniently gripped. The container is then placed in the refrigerating compartment 28 with its flat face 32 resting on the liner element. The terminal plug 80 on the end of its cord 37 is then inserted in a wall socket. The motor through the reduction gearing will rotate the paddle-bars to agitate the material. The refrigerating element being in contact with the surface 32, will absorb heat from the container through the solid wall between the inner periphery of the container and the flat surface 32 thereon. As a result, freezing of the material will occur in the lower portion of the container. The paddle-bars will continue to agitate the material and scrape the material as it freezes from the lower portion of the inner periphery of the cylindrical container over the surface 32 and mix the frozen portion with the remainder of the material. The agitator-bars 45 will operate alternately across different longitudinal lower portions of the container so that excessive power will not be required to operate them. The material will deflect or rock the paddle-bars 45 toward the periphery of the container so they will act to scrape the lower portion of the container during their rotation. When the material has been frozen to the desired density or extent, the resistance to the paddles will preponderate over the power of the motor and thereupon the motor will stop. By reason of the character of the motor no sparking will result and there will be no harmful effect from stopping the motor without switching off the current. After the motor stops, the container is removed from the refrigerator and the unit comprising the screw-cap 36, agitator shaft 40 with the paddles thereon, the motor and the reduction gearing, will be detached from the container by unscrewing the cap therefrom. This is done while the container rests on its closed end. The adhering frozen material is then removed from the shaft 40 and paddle-bars and directed back into the container. Next, an ordinary screw-cap 81 is screwed onto the container to seal the material therein and the container is placed back on its side in the refrigerator as before, until the frozen edible is ready for consumption.

The invention exemplifies a freezer in which the operating mechanism comprising electric motor, reduction gearing and agitator mechanism can be easily and unitarily connected to and removed from the container, and in which such connection is effected by means of a screw-thread between the unit and the container whereby an effective seal may be formed by relative rotation of the container and the unit; in which the container is formed of metal of high conductivity with a flat portion on its exterior with a solid wall between the flat portion and the interior periphery of the container for efficient thermal conduction between the refrigerating element and the material in the container; in which clutch connections for automatic throw-out switches for stopping the motor are eliminated by providing a motor which will automatically stop without sparking when the material has been frozen to the desired degree; and in which the agitator mechanism is operated at a speed which is conducive to rapid freezing with sufficient agitation for proper blending of the constituents in the mixture. The herein described freezer is efficient in use, comparatively simple in construction, and can be easily manipulated.

The invention is not to be understood as restricted to the details set forth, since these may be modified within the scope of the appended claims, without departing from the spirit and scope of the invention.

Having thus described the invention, what we claim as new and desire to secure by Letters Patent is:

1. In a freezer of the character described, the combination of an elongated container adapted to receive and hold the material to be frozen and to be placed against a refrigerating element for material freezing purposes and having one end thereof closed and its other end open; a removable mounting located at the open end of the container and comprising a cap detachably secured to and serving to close said open end of the container, a housing positioned on the outside of, and held in fixed relation with respect to, the cap and embodying a continuous side wall with one end thereof abutting against the cap and an end wall at the other end of the continuous wall, and a plate extending transversely across the inner portion of the housing and positioned in spaced relation with the cap; a stuffing box carried by and extending through the plate and cap; a rotatable spindle journaled in the stuffing box and having one end thereof projecting into the container and its other end extending into the space between the plate in said end wall of the housing; a paddle-equipped shaft connected to said one end of the spindle and extending into the container; an electric motor disposed in said space in the housing; and speed-reducing gear in said space extending between the armature shaft of the motor and said other end of the spindle and serving during operation of the motor to drive the shaft through the medium of the spindle.

2. In a freezer of the character described, the combination of an elongated container adapted to receive and hold the material to be frozen and to be placed against a refrigerating element for material freezing purposes and having one end thereof closed and its other end open; a removable mounting located at the open end of the container and comprising a cap detachably secured to and serving to close said open end of the container, a one piece housing positioned on the outside of the cap and embodying a continuous side wall with one end thereof abutting against the cap and an end wall at the other end of the continuous wall, a plate in the housing and adjacent to the cap fixedly secured to said cap and having an inwardly extending marginal flange engaging and serving to space it from the cap; a partition extending transversely across the central portion of the housing, and spacers extending between and secured to the plate and the partition and to the spacers extending between and secured to said partition and the end wall of the housing for securing the partition and housing in fixed relation with the cap; spindle extending through the central portions of the cap and plate and having one end thereof projecting into the container and its other end extending into the space between the plate and the partition; a paddle-equipped shaft connected to said one end of the spindle and extending into the container; an electric motor disposed in the housing between the partition and the end wall and having one end of the armature shaft thereof projecting through said partition into said space between the plate and the cap; and speed-reducing gearing in said space and between said projecting end of the armature shaft and said other end of the spindle for driving said shaft from the motor.

3. In a freezer of the character described, the combination of a cylindrical container for material to be frozen formed of metal of high conductivity and having one end thereof closed and its other end open and also having an integral longitudinally extending enlargement extending, and terminating adjacent, to the ends thereof and having a flat coextensive face adapted to rest on and engage a refrigerating element and to support the container in a horizontal position on the element, said enlargement being solid throughout and serving to effect direct thermal conduction from the inner periphery of the container to said flat-surface, a mounting located at the open end of the container and including a cap removably secured to the container and serving to close said open end, a paddle-equipped shaft carried by and removable with the mounting and extending into the container, and an electric motor carried by said mounting and connected to drive the shaft.

4. In a freezer of the character described, the combination of a container for material to be frozen, formed of metal of high conductivity and comprising a solid cylindrical wall having one end thereof closed and its other end open, and provided with an integral external enlargement extending longitudinally thereof and terminating adjacent to its ends and having a coextensive flat face adapted to rest on and engage a refrigerating element and to support the container in a horizontal position on said element, said enlargement having substantially no thickness in the central portion thereof so that the central portion of the face is spaced from the inner periphery of the cylindrical wall a distance substantially equal to the thickness of the wall and being solid throughout and serving to effect direct thermal conduction from the inner periphery of the cylindrical wall to said flat surface, a mounting located at the open end of the container and including a cap removably secured to the container and serving to close said open end, a paddle-equipped shaft carried by and removable with the mounting and extending into the container, and an electric motor mounted on the mounting and connected to drive the shaft.

5. In a freezer of the character described, the combination of a cylindrical container having an open end and a longitudinally extending flat surface on its outside for contacting with a refrigerating element when the container is laid on its side with said surface on the bottom thereof, a shaft extending longitudinally through the central portion of the container, an electric motor positioned adjacent said open end of the container and connected to drive the shaft, a mounting for the shaft and motor provided with a cap detachably connected to, and serving to close the open end of the container, a pair of U-shaped loops connected to and projecting outwardly from opposite sides of the shaft and longitudinally offset one with respect to the other, and a pair of scraper bars carried by and pivotally connected to the outer ends of the loops respectively and approximately half as long as the container, said bars being carried by the loops so that they are longitudinally offset one with respect to the other and being adapted during drive of the shaft by the motor alternately to traverse the portion of the container adjacent the flat surface in contact with the refrigerating element to cause the material to be intermittently and alternately scraped from different longitudinal portions of the bottom of the container.

FRED H. KAUP.
FLOYD H. KINYOUN.